United States Patent
Narayanaswamy et al.

(10) Patent No.: US 8,041,720 B2
(45) Date of Patent: Oct. 18, 2011

(54) ORDERING TELEMETRY MESSAGES

(75) Inventors: Prakash Narayanaswamy, Thanjavur (IN); Jetender Ghuman, Pune (IN); Subramanian Krishnan, Bangalore (IN); Chandrashekar Pathakoti, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 664 days.

(21) Appl. No.: 12/178,461

(22) Filed: Jul. 23, 2008

(65) Prior Publication Data

US 2010/0023518 A1    Jan. 28, 2010

(51) Int. Cl.
*G06F 17/30* (2006.01)
*A61N 1/00* (2006.01)
*G01V 3/00* (2006.01)

(52) U.S. Cl. ........ 707/748; 607/60; 340/3.5; 340/853.1; 340/870.13

(58) Field of Classification Search ............ 707/748, 707/749, 750, 752; 370/394; 607/60; 340/3.5, 340/10.1, 10.2, 853.1, 853.2, 855.3, 870.13
See application file for complete search history.

(56) References Cited

U.S. PATENT DOCUMENTS

| | | | | |
|---|---|---|---|---|
| 4,345,334 A * | 8/1982 | Nordahl | ........................ | 455/501 |
| 5,557,549 A | 9/1996 | Chang | | |
| 5,689,431 A * | 11/1997 | Rudow et al. | ................. | 701/213 |
| 6,115,656 A | 9/2000 | Sudolsky | | |
| 6,427,088 B1 * | 7/2002 | Bowman et al. | ................ | 607/60 |
| 6,437,743 B1 * | 8/2002 | Mintz et al. | .................... | 342/463 |
| 6,811,533 B2 * | 11/2004 | Lebel et al. | ................... | 600/300 |
| 7,525,431 B2 * | 4/2009 | Britton et al. | .............. | 340/572.1 |
| 7,626,508 B2 * | 12/2009 | Kosuge et al. | ................ | 340/612 |
| 7,882,135 B2 * | 2/2011 | Brunner et al. | ............... | 707/791 |
| 2003/0069648 A1 * | 4/2003 | Douglas et al. | .................... | 700/2 |
| 2003/0202527 A1 | 10/2003 | Nahapetian et al. | | |
| 2004/0217880 A1 * | 11/2004 | Clark et al. | ................ | 340/854.9 |
| 2005/0005065 A1 | 1/2005 | Rowlan | | |
| 2006/0025158 A1 * | 2/2006 | Leblanc et al. | ............ | 455/456.2 |
| 2006/0097854 A1 | 5/2006 | Basu et al. | | |
| 2007/0063875 A1 * | 3/2007 | Hoffberg | .................. | 340/995.1 |
| 2007/0182556 A1 * | 8/2007 | Rado | .......................... | 340/572.1 |
| 2007/0296581 A1 * | 12/2007 | Schnee et al. | ............. | 340/572.1 |
| 2008/0084330 A1 * | 4/2008 | Picard | ...................... | 340/870.02 |
| 2008/0086560 A1 * | 4/2008 | Monier et al. | ................ | 709/224 |

(Continued)

OTHER PUBLICATIONS

Hofbaur, M., et al., Hybrid Estimation of Complex Systems, IEEE Transactions on Systems, Man and Cybernetics-Part B: Cybernetics, vol. 34, No. 5, Oct. 2004.

(Continued)

*Primary Examiner* — Shahid Alam
(74) *Attorney, Agent, or Firm* — Ingrassia Fisher & Lorenz, P.C.

(57) ABSTRACT

A method for ordering telemetry messages containing attributes individually not sufficient to establish total ordering is provided. An initial rank value is assigned for a first telemetry message. For a subsequent telemetry message, it is determined if an attribute of the subsequent telemetry message indicates an ordering of the subsequent telemetry message with respect to the first telemetry message. If the attribute indicates the ordering of the subsequent telemetry message, a subsequent rank value is assigned to the subsequent telemetry message one higher than a highest rank value already assigned, otherwise a correct slot of the subsequent message is determined by minimizing a distance from an S slot corresponding to the highest rank value already assigned to a first non-empty slot by application of a Lazy Walker algorithm.

20 Claims, 3 Drawing Sheets

U.S. PATENT DOCUMENTS

| | | | | |
|---|---|---|---|---|
| 2008/0111693 A1* | 5/2008 | Johnson et al. | ............ | 340/572.1 |
| 2008/0129537 A1* | 6/2008 | Osterloh et al. | ......... | 340/870.02 |
| 2008/0132185 A1* | 6/2008 | Elliott et al. | ............... | 455/115.4 |
| 2008/0158006 A1* | 7/2008 | Pisoni et al. | ............... | 340/854.8 |
| 2008/0270220 A1* | 10/2008 | Ramer et al. | .................... | 705/10 |
| 2008/0306980 A1* | 12/2008 | Brunner et al. | ............... | 707/803 |

OTHER PUBLICATIONS

Cinquemani, E., et al., Fault detection in a class of stochstic hybrid systems, vol. 3, pp. 3197-3203, Dec. 14, 2004.

* cited by examiner

ORDERING TELEMETRY MESSAGES

FIELD OF THE INVENTION

The present invention generally relates to vehicle telematics, and more particularly, but not exclusively, to a system, method, and computer program product for ordering telemetry messages containing attributes individually not sufficient to establish total ordering.

BACKGROUND OF THE INVENTION

Telemetry is an enabling technology for large complex systems such as missiles, spacecraft, oilrigs, and chemical plants because it allows automatic monitoring, alerting, and record-keeping necessary for safe, efficient operations. Organizations such as the National Aeronautics and Space Administration (NASA), the European Space Agency (ESA) and other agencies use telemetry/telecommand systems to collect data from a monitored asset, such as operating spacecraft and satellites. Often this data is received from the monitored asset in the form of a series, or set, of messages.

Telemetry data is important in the development phase of missiles, satellites and aircraft because, at least in part, the monitored asset might be destroyed after/during the test. Engineers need critical system parameters in order to analyze (and improve) the performance of the system. Without telemetry, these data would often be unavailable.

Establishing a total ordering relationship among the elements of a set of messages received from a monitored asset may sometimes be difficult or impossible if the attributes of the elements based on which total ordering has been defined is complex (interdependent and bounded). This is particularly true in case of telemetry. The messages generated by the recording equipment of the monitored asset may contain attributes that may individually not be enough to establish total ordering. A combination of message metadata along with the some information contained within the message may have to be used to establish relative ordering.

Accordingly, a need exists for a mechanism to establish a total ordering relationship of a set of messages where establishing the relationship among a dynamically growing set of messages is difficult or impossible due to complex elements as described above. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In one embodiment, by way of example only, a method for ordering telemetry messages containing attributes individually not sufficient to establish total ordering is provided. An initial rank value is assigned for a first telemetry message. For a subsequent telemetry message, it is determined if an attribute of the subsequent telemetry message indicates an ordering of the subsequent telemetry message with respect to the first telemetry message. If the attribute indicates the ordering of the subsequent telemetry message, a subsequent rank value is assigned to the subsequent telemetry message one higher than a highest rank value already assigned, otherwise a correct slot for the subsequent telemetry message is determined by minimizing a distance from an S slot corresponding to the highest rank value already assigned to a first non-empty slot by application of a Lazy Walker algorithm.

In another embodiment, again by way of example only, a system for ordering telemetry messages containing attributes individually not sufficient to establish total ordering is provided. An ordering module is in communication with a monitored asset. The ordering module is adapted for assigning an initial rank value for a first telemetry message. The ordering module is further adapted for, for a subsequent telemetry message, determining if an attribute of the subsequent telemetry message indicates an ordering of the subsequent telemetry message with respect to the first telemetry message. The ordering module is further adapted for, if the attribute indicates the ordering of the subsequent telemetry message, assigning a subsequent rank value to the subsequent telemetry message one higher than a highest rank value already assigned, otherwise determining a correct slot for the subsequent telemetry message by minimizing a distance from an S slot corresponding to the highest rank value already assigned to a first non-empty slot by application of a Lazy Walker algorithm.

In still another embodiment, again by way of example only, a computer program product for ordering telemetry messages containing attributes individually not sufficient to establish total ordering is provided. The computer program product comprises a computer-readable storage medium having computer-readable program code portions stored therein. The computer-readable program code portions comprise a first executable portion adapted for assigning an initial rank value for a first telemetry message, and a second executable portion adapted for, for a subsequent telemetry message, determining if an attribute of the subsequent telemetry message indicates an ordering of the subsequent telemetry message with respect to the first telemetry message, wherein if the attribute indicates the ordering of the subsequent telemetry message, assigning a subsequent rank value to the subsequent telemetry message one higher than a highest rank value already assigned, otherwise determining a correct slot for the subsequent telemetry message by minimizing a distance from an S slot corresponding to the highest rank value already assigned to a first non-empty slot by application of a Lazy Walker algorithm.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present description and following claimed subject matter present exemplary system, method, and computer program product embodiments of a mechanism to order telemetry messages in situations where attributes of the messages are insufficient to establish a total ordering relationship. In some embodiments, the mechanisms may be implemented in vehicle telematics platforms. The illustrated embodiments may implement a "Lazy Walker" algorithm to assist in ordering the messages as will be further described. The Lazy Walker algorithm may be useful to identify a "correct slot" corresponding to a rank value of a particular message. The Lazy Walker algorithm operates to minimize the distance the incoming telemetry message has to "walk." During the minimized distance walk, if the algorithm takes the message in a clockwise direction, the message may be qualified as new. On the other hand, if the algorithm takes the message in the anti-clockwise or counterclockwise direction, the message may be qualified as delayed. In the case of delayed messages, left and right "neighbors" of the delayed message are located. Use of the terms left and right neighbors are metaphors to partially describe the functionality of the illustrated embodiments, and will also be further illustrated, following. A rank value may be assigned as a mean of rank values of the left and right neighbors.

Figure 1:
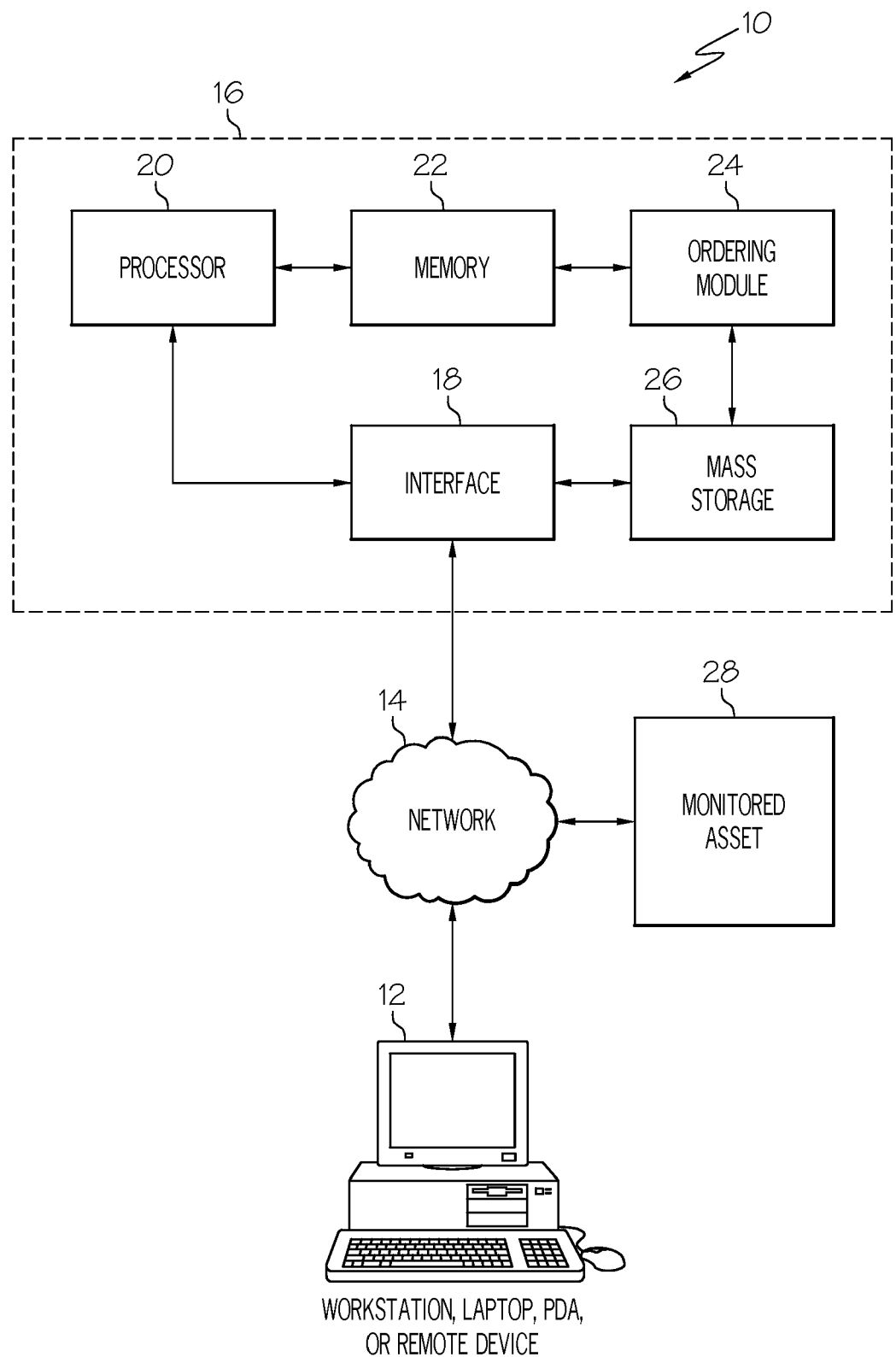
FIG. 1 illustrates an exemplary system for ordering telemetry messages.

FIG. 1 is functional block diagram of an exemplary computing environment 10 for implementing one or more aspects of the ordering mechanism as will be described. Computer workstation 12, laptop 12, PDA 12, remote device 12, or a similar device is connected to a network 14. Network 14 can include an intranet, an extranet, and similar network connectivity to other computer devices such as the world wide web (WWW) or provide wireless connectivity, such as in the case of a monitored asset in an aerospace environment. A server 16 having a connection to network 14 includes an interface 18, a processor 20, memory 22, ordering module 24, and mass storage 26. As one skilled in the art will appreciate, the components of server 16 may vary from application to application. In addition, more than one server 16, or the components thereof, may be connected to network 14 in a particular implementation. The functionality of ordering module 24 will be further described below. Ordering module 24, in conjunction with processor 20, may perform operations associated with the ordering functionality as will be described.

A monitored asset 28 having is also coupled to the network 14. Monitored asset 28 (as well as workstation 12) may also include such components as an interface 18, processor 20, memory 22, and mass storage 26 as one skilled in the art will appreciate. Such components are not illustrated for purposes of convenience. In addition, a number of monitored assets 28 may be connected across the network 14. For example, a first monitored asset 28 may be located in a first location. A second monitored asset 28 may be located across network 14 in a second location, and so forth. Monitored asset 28 may also include an ordering module 24 for performing onboard ordering operations. As the skilled artisan will expect, monitored asset 28 may include a vehicle, a spacecraft, or similar.

Monitored asset 28 may generate and record telemetry messages. The messages may be sent over network 14 to server 16 and/or device 12. The messages may be received by the server 16 and/or device 12 and recorded, such as on mass storage device 26 or elsewhere. The messages may then be ordered by ordering module 24 and re-stored in a total ordering relationship, again on mass storage device 26 or elsewhere.

Device 12 uses hardware, software, firmware, or a combination thereof to access network 14, server 16, and monitored asset 28. A user, for example, may execute a web browser which executes software on the workstation and queries the server 16 and/or monitored asset 28 for information. In one embodiment, the workstation 12 may present information such as returned objects to a user. The returned objects may be provided to the workstation 12 over the network 14 from server 16. Processor 20 may execute software to query mass storage 26 for data, such as ordering data of received messages. The data may be read from mass storage device 26 and provided through interface 18 and network 14 to workstation 12 where it is displayed to the user as part of a graphical user interface (GUI) on a suitable display device such as a monitor.

The illustrated embodiments compute a rank for element of a set of messages. Use of the term rank may refer to a decimal number of desired length. For any new incoming message whose attributes clearly indicate that the message is the latest message from the monitored asset, the assigned rank value is one higher than a highest rank value already assigned.

For those messages whose attributes are insufficient to establish the message's relative position, computing and assigning the message's rank value may be a two step process. First, a correct "slot" for the message may be identified by use of the Lazy Walker algorithm as previously described. "Slots" as used herein are abstractions that represent the various values a bounded attribute can take. A bounded attribute is an attribute whose values wraps around/resets after reaching a max value defined in its domain. Second, messages having a clockwise walk are qualified as new messages; messages having a counterclockwise walk are qualified as delayed messages. For delayed messages, left and right neighbors of the message are identified. The rank value of an incoming message may be assigned to a value corresponding to the correct slot. For delayed messages, the rank value of the message may be computed by taking a mean of rank values of the identified left and right neighbors.

Figure 2:
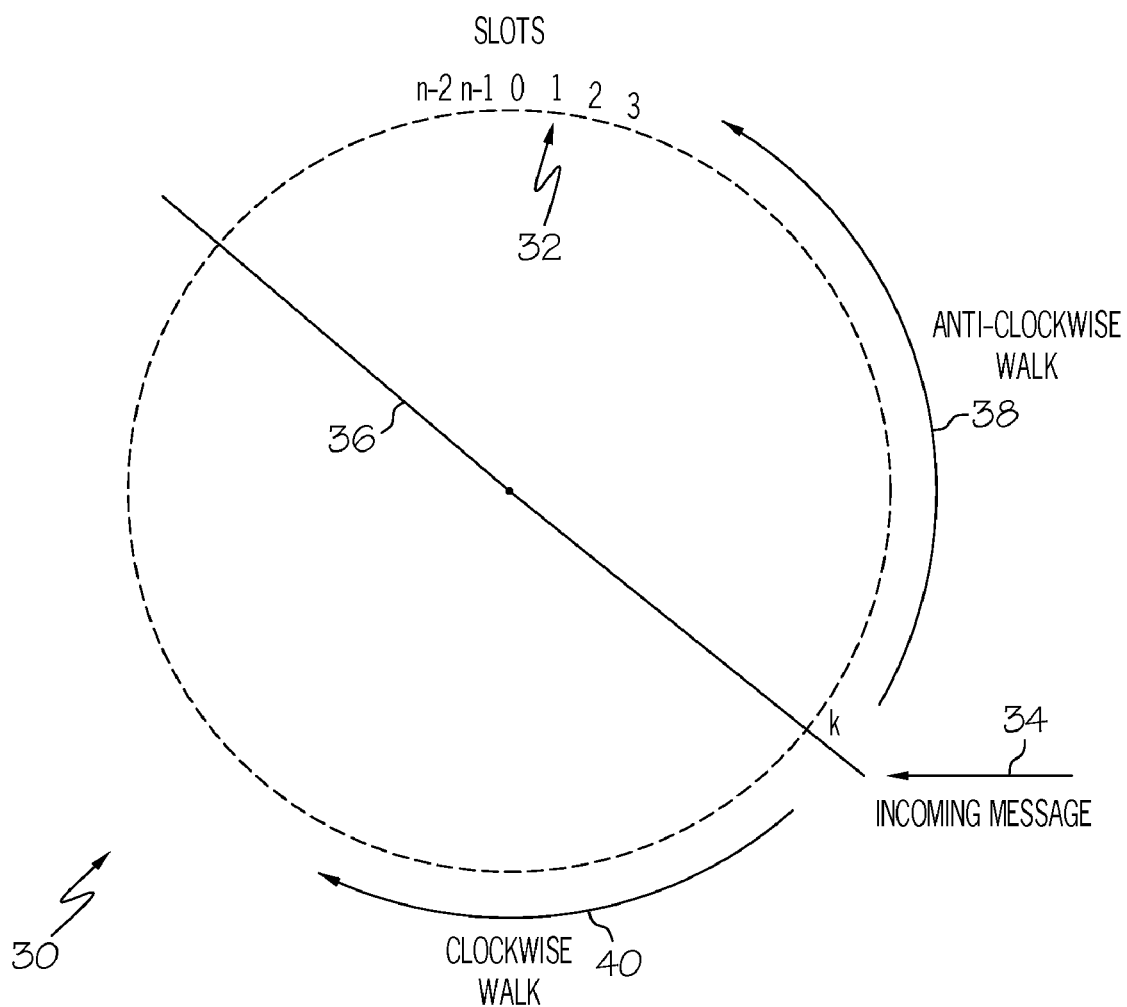
FIG. 2 illustrates an exemplary Lazy Walker algorithm.

The Lazy Walker algorithm may be useful in determining a correct slot, and further, to determine left and right neighbors for delayed messages as presently described and illustrated in FIG. 2. Circle 30 illustrates an application of the Lazy Walker algorithm in the following example. Consider n points or "slots" 32 numbered from zero (0) to (n−1), distributed equi-spaced along the circumference of the circle 30. Let S represent the sequence number of the telemetry message corresponding to the highest ranking telemetry update from the monitored asset. This point on the circumference of circle 30 is marked, and a line 36 is passing through the point (k) and the center of the circle is drawn. The line 36 divides the circle 30 into two equal halves, with (n/2−1) points on either side of the line 36.

The Lazy Walker algorithm tries to minimize the distance the incoming new message 34 must "walk" from the slot S before it finds the correct slot. If application of the algorithm results in a clockwise walk 40, the incoming message 34 is marked as a new message. If application of the algorithm results in a counterclockwise walk 38, the incoming message is marked as delayed.

For delayed messages, the correct slot for any new incoming message 34 is the slot matching its sequence number and that does not violate any of the predicates set by the first non-empty slot on the left, the left neighbor, and the first non-empty slot on the right, the right neighbor.

Consider, for instance, an equipment E, with an S-slot-996, and an incoming message from the same equipment with a sequence number of 4. Also assume that the incoming message has the same recorded timestamp as does the message corresponding to 996. Applying the Lazy Walker algorithm to message 4 would walk the message clockwise because the Lazy Walker algorithm always attempts to minimize the distance a message has to travel before it identifies its slot on the circumference of the circle.

Figure 3:
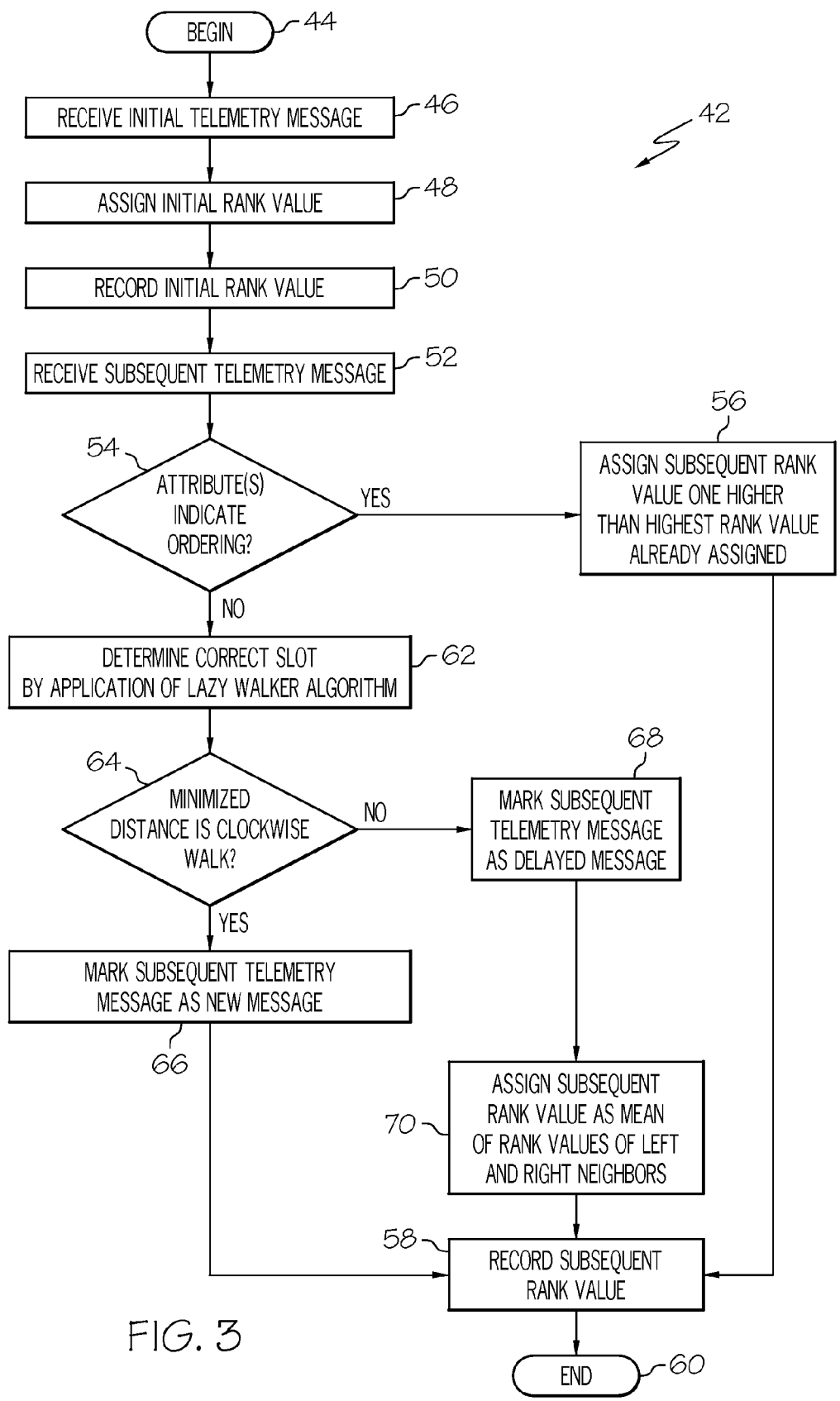
FIG. 3 illustrates an exemplary method for ordering telemetry messages.

FIG. 3, following, illustrates an exemplary method 42 of ordering telemetry messages in light of the foregoing. As one skilled in the art will appreciate, various steps in the method may be implemented in differing ways to suit a particular application. For example, various steps in the methods may be omitted, modified, or may be carried out in differing orders. In addition, various steps may be implemented by differing means, such as by hardware, firmware, or software, or a combination thereof operational on, or associated with, the computing environment 10 (FIG. 1). For example, the methods may be embodied in computer program products, such as digital versatile discs (DVDs) compact discs (CDs) or other storage media. The computer program products may include computer readable program code having executable portions for performing various steps as illustrated in the following methods.

FIG. 3, following, illustrates an exemplary method 42 of ordering telemetry messages. Method 42 begins (step 44) with the receipt of an initial telemetry message from the monitored asset (step 46). The initial message is assigned an initial rank value (step 48), which may be recorded in the computing environment or elsewhere (step 50).

A subsequent telemetry message is received at a later time (step 52). If the attribute(s) in the message indicate the relative ordering of the message (step 54), the subsequent telemetry message is assigned a subsequent rank value one higher than a highest rank value already assigned (step 56). The subsequent rank value is recorded (step 58), and the method 44 then ends (step 60).

If the attribute(s) of the subsequent telemetry message do not indicate a relative ordering (again, step 54), then a correct slot (based on a minimized distance from the S slot to the first non-empty slot in either a clockwise or counterclockwise direction) is determined by application of the Lazy Walker algorithm (step 62) as previously described. If the minimized distance is a clockwise walk (step 64), the subsequent telemetry message is marked as new (step 66). Otherwise, the subsequent telemetry message is marked as delayed (step 68). For delayed messages, the subsequent telemetry message is assigned a rank value as the mean of rank values of the message's left and right neighbors (step 70). The subsequent rank value is recorded (again, step 58), and the method 44 ends (step 60).

Some of the functional units described in this specification have been labeled as "modules" in order to more particularly emphasize their implementation independence. For example, functionality labeled as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for ordering telemetry messages containing attributes individually not sufficient to establish total ordering, comprising:
    assigning an initial rank value for a first telemetry message; and
    for a subsequent telemetry message, determining if an attribute of the subsequent telemetry message indicates an ordering of the subsequent telemetry message with respect to the first telemetry message, wherein if the attribute indicates the ordering of the subsequent telemetry message, assigning a subsequent rank value to the subsequent telemetry message one higher than a highest rank value already assigned, otherwise:
        determining a correct slot for the subsequent telemetry message by minimizing a distance from an S slot corresponding to the highest rank value already assigned to a first non-empty slot by application of a Lazy Walker algorithm.

2. The method of claim 1, further including receiving the first and subsequent telemetry messages from a monitored asset.

3. The method of claim 1, further including recording the initial rank value for the first telemetry message and the subsequent rank value for the subsequent telemetry message in order to establish a total ordering relationship.

4. The method of claim 1, wherein determining a correct slot for the subsequent telemetry message includes determining if minimizing the distance results in a clockwise or counterclockwise walk from the S slot to the first non-empty slot.

5. The method of claim 4, wherein determining a correct slot for the subsequent telemetry message includes marking the subsequent telemetry message as a new message if a minimized distance results in a clockwise walk to the first non-empty slot.

6. The method of claim 5, wherein determining a correct slot for the subsequent telemetry message includes marking the subsequent telemetry message as a delayed message if the minimized distance results in a counterclockwise walk to the first non-empty slot.

7. The method of claim 6, further including assigning the subsequent rank value as a mean of rank values of left and right neighbors of the first non-empty slot if the minimized distance results in a counterclockwise walk to the first non-empty slot.

8. A system for ordering telemetry messages containing attributes individually not sufficient to establish total ordering, comprising:
an ordering module in communication with a monitored asset, wherein the ordering module is adapted for:
assigning an initial rank value for a first telemetry message,
for a subsequent telemetry message, determining if an attribute of the subsequent telemetry message indicates an ordering of the subsequent telemetry message with respect to the first telemetry message, wherein if the attribute indicates the ordering of the subsequent telemetry message, assigning a subsequent rank value to the subsequent telemetry message one higher than a highest rank value already assigned, otherwise:
determining a correct slot for the subsequent message by minimizing a distance from an S slot corresponding to the highest rank value already assigned to a first non-empty slot by application of a Lazy Walker algorithm.

9. The system of claim 8, wherein the ordering module is further adapted for receiving the first and subsequent telemetry messages from a monitored asset.

10. The system of claim 8, wherein the ordering module is further adapted for recording the initial rank value for the first telemetry message and the subsequent rank value for the subsequent telemetry message in order to establish a total ordering relationship.

11. The system of claim 8, wherein the ordering module is further adapted for determining if minimizing the distance results in a clockwise or counterclockwise walk from the S slot to the first non-empty slot.

12. The system of claim 11, wherein the ordering module is further adapted for at least one of:
marking the subsequent telemetry message as a new message if a minimized distance results in a clockwise walk from the S slot to the first non-empty slot, and
marking the subsequent telemetry message as a delayed message if the minimized distance results in a counterclockwise walk to the first non-empty slot.

13. The system of claim 12, wherein the ordering module is further adapted for assigning the subsequent rank value as a mean of rank values of left and right neighbors of the first non-empty slot if the minimized distance results in a counterclockwise walk to the first non-empty slot.

14. A computer program product for ordering telemetry messages containing attributes individually not sufficient to establish total ordering, the computer program product comprising a computer-readable storage medium having computer-readable program code portions stored therein, the computer-readable program code portions comprising:
a first executable portion adapted for assigning an initial rank value for a first telemetry message; and
a second executable portion adapted for, for a subsequent telemetry message, determining if an attribute of the subsequent telemetry message indicates an ordering of the subsequent telemetry message with respect to the first telemetry message, wherein if the attribute indicates the ordering of the subsequent telemetry message, assigning a subsequent rank value to the subsequent telemetry message one higher than a highest rank value already assigned, otherwise:
determining a correct slot of the subsequent message by minimizing a distance from an S slot corresponding to the highest rank value already assigned to a first non-empty slot by application of a Lazy Walker algorithm.

15. The computer program product of claim 14, further including a third executable portion adapted for receiving the first and subsequent telemetry messages from a monitored asset.

16. The computer program product of claim 14, further including a third executable portion for recording the initial rank value for the first telemetry message and the subsequent rank value for the subsequent telemetry message in order to establish a total ordering relationship.

17. The computer program product of claim 14, wherein the second executable portion adapted for determining a correct slot of the subsequent message further includes a third executable portion for determining if minimizing the distance results in a clockwise or counterclockwise walk from the S slot to the first non-empty slot.

18. The computer program product of claim 17, wherein the second executable portion adapted for determining a correct slot for the subsequent telemetry message includes a fourth executable portion for marking the subsequent telemetry message as a new message if the minimized distance results in a clockwise walk from the S slot to the first non-empty slot.

19. The computer program product of claim 18, wherein the second executable portion adapted for determining a correct slot for the subsequent telemetry message includes a fifth executable portion for marking the subsequent telemetry message as a delayed message if the minimized distance results in a counterclockwise walk to the first non-empty slot.

20. The computer program product of claim 19, wherein the second executable portion adapted for determining a correct slot for the subsequent telemetry message includes a sixth executable portion for assigning the subsequent rank value as a mean of rank values of left and right neighbors of the first non-empty slot if the minimized distance results in a counterclockwise walk to the first non-empty slot.

* * * * *